Patented Apr. 27, 1954

2,676,888

UNITED STATES PATENT OFFICE 2,676,888

MANUFACTURE OF NUTRIENT MATERIAL FROM WHEAT GERM

Robert J. Westfall, Drexel Hill, Pa., assignor to Merck & Co., Inc., a corporation of New Jersey No Drawing. Application June 17, 1949,
Serial No. 99,857

2 Claims. (Cl. 99—17)

This invention relates to a nutrient product and particularly to the production from wheat germ of a nutrient product for oral administration which is suitable as a dietary supplement and/or for medicinal purposes.

The object of this invention is to provide a material for oral administration which supplies the necessary nitrogenous materials required for the sustenance of life, which is non-toxic, readily assimilated, economical to prepare and is of high nutritive value.

Wheat germ is recognized as a valuable, inexpensive source of protein, the protein content being in excess of thirty percent of the germ, and of as good quality and supplementation value as the proteins of skim milk and certain other animal proteins.

However, wheat germ contains water soluble materials, some of which are undesirable in an oral protein hydrolysate. It also contains substantial amounts of starch which, if allowed to remain, cause considerable mechanical difficulties in the production of a protein hydrolysate, especially in the steps involving separation of the liquid from the solid material after proteolytic enzymic action. In addition there are also present carbohydrates which, if not removed, are present in the end product in the form of reducing sugars, tending to render the end product unstable.

The process contemplated by this invention is distinguishable from processes described in the earlier literature in that in this process the undesirable elements enumerated above are removed and discarded before the protein of the wheat germ is subjected to the digestive action of the proteolytic enzyme. If papain is the proteolytic enzyme employed, it requires no activation in this process, and the digestion does not have to be continued too long, sixteen to twenty hours being sufficient to give a satisfactory product.

The advantages of the process are that it is relatively simple and economical to perform on a commercial scale. The product made from it is readily assimilable on oral administration. Its protein content is high, ranging from seventy-five percent (N×6.25) upward. When compared with casein as the sole source of protein in the diet of mice according to a standardized method, it gives seventy-five to one hundred percent as much growth per gram of protein consumed as casein. It is non-toxic. When fed to experimental animals as the sole source of protein, it not only supports good growth, but causes no undesirable symptoms. The carbohydrate content is very low so that if carbohydrate is desired in the product, it can be added, with the obvious advantage that the type and quantity of carbohydrate can be controlled. Its ash content is low, and it is more palatable than similar products made by other processes.

The product is prepared by this process by first mixing wheat germ into a heated acid medium to remove water soluble, undesirable materials. The pH range of the medium may vary from about 4 to about 6, with the preferred pH at about 5, the purpose being to maintain a pH which minimizes protein loss and which also provides a satisfactory pH for the enzyme actions which follow. Any inorganic and organic acids which do not destroy the wheat germ can be used, for example, hydrochloric, sulfuric, citric and acetic acids will be found satisfactory. Hydrochloric acid seems preferable from the viewpoint of taste of the product. Best results are obtained when the medium is heated before the wheat germ is added, and the temperature maintained thereafter for several minutes while the mixture is stirred. About five minutes at 90–100° C. should suffice with thirty minutes as a maximum. Stirring, while not essential, is preferable to aid dispersion of the wheat germ in the solution. The ratio of water to germ may vary from as little as about four parts water to one of germ, to as much as about sixteen parts water to one of germ. The ratio of about eight parts water to one of germ is best from the standpoint of yield and quality of product.

The suspension is then cooled by diluting it with an equal volume of water. This also facilitates the diastatic enzyme action which follows. The temperature to which the suspension is cooled will depend upon the enzyme to be used, and the suitable temperature for the various enzymes which can be used are known. If dilution with an equal volume of water does not lower the temperature to the desired range, the suspension may be further cooled by immersion in a water bath or other suitable means. In the case of malt diastase, a temperature of about 55° C. is desirable since this is near the practical upper temperature range at which this enzyme will act. The diastatic enzyme is then added and the mixture allowed to stand one to two hours with stirring. The temperature need not be maintained since it does not fall much in this time. Stirring is highly desirable to maintain the efficiency of the digestion. The amount of diastase to be added may vary from about one percent to five percent by weight of the amount of wheat germ present, the purpose being to digest all of the starch present. In the case of diastatic malt syrup, about two percent has been found satisfactory. The potency of the diastases that can be used varies so that with a diastase of high potency a smaller quantity may be used than with a diastase of lower potency. Several types of malt diastase may be used equally well, also mold and bacterial diastases. I have preferred diastatic malt syrup, which has a potency of three hundred degrees Lintner, over takadiastase, T-P diastofor, diastofor L and Rhozyme DX, but these others can be used. The period of incubation may vary, the purpose being to allow sufficient time for digestion, and for this probably one hour is ample.

The suspension is then dewatered by suitable means such as screening, centrifugation or filtration. The solids may then be washed a second time by adding water, preferably in the same ratio as the first washing, and then dewatering as before. The purpose of the second wash is to further purify the solids by removal of water soluble material. While the second washing is not essential, it is desirable, especially if dewatering is by screening, since this is a cruder method of separation than centrifugation or filtration.

The solids are then added to water, the quantity of water preferably being in about the same ratio as in the first washing. The mixture is then heated to a temperature suitable for proteolytic enzyme action and the enzyme added. A number of enzymes are suitable, such as papain, trypsin, ficin and bromelin. Papain is preferable. The pH of the suspension will be slightly higher than the pH of the original suspension, but the increase in pH is not very great and is within the range at which the proteolytic enzyme will act. No attempt is made to control the pH as this would necessitate adding undesirable substances such as an alkali which would increase the ash content of the product. For the enzyme action the pH can be in the range of about 4 to 8, but a pH of about 5 or slightly higher is convenient and gives satisfactory results. The temperature will depend upon the enzyme used and the suitable temperature for the various enzymes that can be used can be determined from text books or like sources. If papain is used, the temperature may vary from about 35° C. to about 80° C., although a temperature in the range of approximately 65-70° C. is preferable. Also, if papain is used, it is preferable to mix the papain with water before adding it to the mixture. This amount of water may vary but a volume of water equal to about one percent of the total volume of the wheat germ suspension gives satisfactory results. The amount of enzyme to be added may vary, the usable range being from about 0.5 percent of protein present to about four percent. In the case of papain, about one percent of the protein present has been found satisfactory from the viewpoint of desirability of the product. Digestion is allowed to continue for several hours. The suspension need not be agitated except for purposes of temperature control. Digestion for approximately sixteen to twenty hours furnishes a desirable product, although it may be continued for a longer period with a slight increase in yield.

The suspension is then separated by suitable means such as screening, centrifugation or filtration and the filtrate heated to 90°–100° C. to inactivate the enzyme and especially to coagulate any heat coagulable proteins. About fifteen minutes is usually sufficient for this. The hot solution is then filtered and the filtrate concentrated or dried by suitable means such as evaporation or spray drying. It is desirable to filter the solution while it is hot in order to obtain a clear filtrate.

When spray dried, the product, in a solid state, is a light yellowish powder, very soluble and highly hygroscopic. It has a total nitrogen of about ten percent, a total amino nitrogen of about two to two and one-half percent and its ash, fat and carbohydrate contents are very low.

In solution it is yellowish brown and in concentrated solution has a pH of about 4. It gives at least thirty percent protein concentration in a solution thin enough to pour and drink. No precipitate has been observed in solutions kept at room temperature for several days so long as bacterial contamination does not occur. It is of high nutritive value being seventy-five to one hundred percent of casein and supports good growth.

Although it can be used as a nutritive substance in the above state, its taste is moderately strong, but is such as to be readily susceptible to modification in various ways. For this reason it is preferable, from the viewpoint of making it more palatable to mix it with sucrose syrup and parasept solution in 95% ethanol and preferably in the ratio of about seventy-three and one-half percent protein hydrolysate, twenty-six percent sucrose syrup and 0.5 percent parasept solution in 95% ethanol. This gives a pleasant, palatable, stable, product suitable for commercial use as a dietary supplement.

A typical example of a nutrient material prepared in accordance with this invention is as follows:

One hundred liters of tap water and 900 cc. of 3NHCl are mixed and heated to 90° to 100° C. Fifteen kg. of wheat germ are added with stirring so as to be dispersed completely. The pH is then about 5. The mixture is maintained at a temperature of about 90° to 100° C. for about fifteen minutes with stirring.

One hundred liters more of tap water are then added to the mixture. This should cool the mixture to about 55° C. If not, it can be cooled further by suitable means such as immersion in water. Three hundred grams of diastatic malt syrup is then added and the mixture allowed to stand for about an hour with stirring. The temperature is not regulated as it does not fall too far in this time. The mixture is then dewatered by use of a rotary screen. Another one hundred liters of tap water are added to the solids and the mixture dewatered again by screening.

The solids are then added to one hundred liters of tap water and the mixture heated to 70° C. Twenty-five grams of papain, which has been thoroughly dispersed in a liter of water, is added to the mixture with stirring. Digestion is allowed to continue for about sixteen hours while the mixture is maintained at a temperature of about 70° C.

The suspension is then separated by screening and the partially clarified solution is heated to 90° to 100° C. for five to fifteen minutes. The hot solution is then filtered using Hyflo Super-Cel as a filter aid. The clear solution is then concentrated or dried by evaporation or spray drying.

I claim:

1. A process of preparing a nutrient material which comprises washing wheat germ in an acid medium at a pH at which protein loss will be minimized and which will be suitable for the enzyme actions which follow, subjecting the starches present to the action of a diastatic enzyme until they are hydrolyzed to water soluble substances, separating the solids from the solution, digesting the solids with a proteolytic enzyme in an aqueous medium at a pH at which and at a temperature at which the proteolytic enzyme is active, separating the solution from the undissolved material, heating the solution to approximately 90°–100° C. to inactivate the proteolytic enzyme and to coagulate heat coagulable proteins, removing the undissolved materials and concentrating or drying the filtrate.

2. A process of preparing a nutrient material which comprises washing wheat germ in a hydrochloric acid solution which is at a pH of about 5 and which has been heated to about 90°–100° C., cooling the mixture to about 55° C., subjecting the starches present to the action of malt diastase syrup until they are hydrolyzed to water soluble substances, separating the undissolved material from the liquid, adding the undissolved material to water, digesting the mixture with papain for about sixteen to twenty hours at a temperature of about 70° C., removing the undissolved material, heating the filtrate to about 90°–100° C. for about fifteen minutes, filtering the solution and concentrating or drying the filtrate.

References Cited in the file of this patent

UNITED STATES PATENTS

| Number | Name | Date |
|---|---|---|
| 863,974 | Emery | Aug. 20, 1907 |
| 1,013,497 | Klopfer | Jan. 2, 1912 |
| 1,425,033 | Moffatt | Aug. 8, 1922 |
| 1,541,263 | Hoffman | June 9, 1925 |
| 2,051,017 | Schwarz | Aug. 11, 1936 |
| 2,238,329 | Julian | Apr. 15, 1941 |

FOREIGN PATENTS

| Number | Country | Date |
|---|---|---|
| 19,726 | Great Britain | of 1908 |